(No Model.)

W. C. WHEELER.
FRUIT JAR.

No. 308,815. Patented Dec. 2, 1884.

Witnesses:
T. H. Parsons.
J. R. Drake.

William C. Wheeler
Inventor, by
J. R. Drake,
Atty.

UNITED STATES PATENT OFFICE.

WILLIAM C. WHEELER, OF LOCKPORT, NEW YORK, ASSIGNOR OF ONE-HALF TO OLIVER C. WRIGHT, OF SAME PLACE.

FRUIT-JAR.

SPECIFICATION forming part of Letters Patent No. 308,815, dated December 2, 1884.

Application filed April 14, 1884. (No model.)

*To all whom it may concern:*

Be it known that I, WILLIAM C. WHEELER, a citizen of the United States, residing at Lockport, in the county of Niagara and State of New York, have invented certain new and useful Improvements in Fruit-Jars, of which the following is a specification, reference being had therein to the accompanying drawings.

The object of this invention is to furnish a fruit-jar in which fruit can be put and the air excluded without heating the jar and fruit to expel the air before sealing or closing the jar, as is now generally the custom, the sirup or juice only being heated and then poured in; and the invention consists in a hollow deep cover that sets inside the neck of the jar and fills the neck-space, the cover also being supplied with an air-vent, and being held in place by a metal screw and a bail, all as fully explained.

Figure 1:
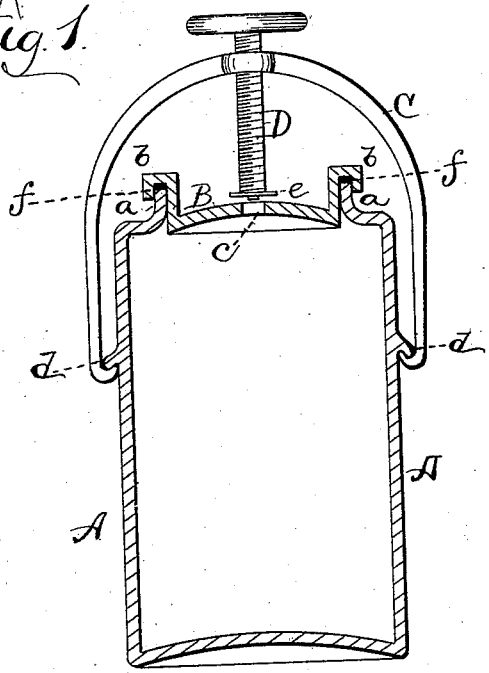
Figure 2:
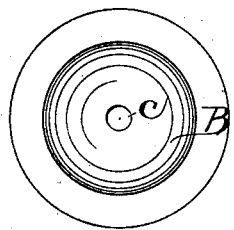

In the drawings, Figure 1 is a vertical cross-section of the jar and cover, and Fig. 2 a top plan of cover.

A represents the jar, and *a* the neck. B is a hollow and rather deep cover, which sets closely inside the neck *a*, filling the neck entirely. It has a high and overhanging flanged rim, *b*, closely fitting around the jar-neck, and with an interposed rubber ring, *f*, on top of the neck. To the center of the cover is a vent-hole, *c*, for air-escape.

C is a metal bail or fastener, its ends hooked so as to clasp on knobs *d d*, cast on the outside of jar A. In the center of this bail a screw, D, passes through its end, provided with a cap or cover, *e*, for the air-opening *c*, to seal up the jar. This cap will have an attached rubber or other soft or flexible cover to set on the vent *c* when screwed down in place.

The operation is simple. The fruit is put in the jar cold and the hot juice or sirup poured thereon. Then the cover B is gently pressed down by hand onto the fruit, &c., and continued until the sirup and bubbling air cease to escape through the vent *c* into the hollow top of the cover, and the rim of the cover sets down squarely onto the neck of the jar. Leaving this sirup in the top of the cover for a moment, then the cap *e* is screwed down through it onto the vent *c*, and the jar is hermetically sealed. Therefore the fruit cannot mold, and the flavor of delicate fruits is the better preserved, as no boiling is done, by which the original aroma escapes. The fruit-jar is also opened without trouble by a turn of the screw.

I do not claim, broadly, the jar, the vent, the bail, or a screw.

I claim—

The combination of a jar, A, having the fastening-knobs *d d*, the deep hollow cover B, with overhanging rim *b* and a central vent, *c*, rubber *f*, fastening-bail C, and its screw D, with attached vent-cover *e*, all arranged and operating substantially as and for the purpose specified.

In testimony whereof I affix my signature in presence of two witnesses.

WILLIAM C. WHEELER.

Witnesses:
J. R. DRAKE,
O. C. WRIGHT.